United States Patent
Rule et al.

(10) Patent No.: US 9,821,529 B2
(45) Date of Patent: Nov. 21, 2017

(54) DEBONDABLE ADHESIVE ARTICLE AND METHODS OF MAKING AND USING THE SAME

(75) Inventors: Joseph D. Rule, Cottage Grove, MN (US); Ross E. Behling, Woodbury, MN (US); Nicholas A. Lee, Woodbury, MN (US); Leslie M. LeBow, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/233,398

(22) PCT Filed: Jul. 19, 2012

(86) PCT No.: PCT/US2012/047274
§ 371 (c)(1),
(2), (4) Date: Jan. 17, 2014

(87) PCT Pub. No.: WO2013/012973
PCT Pub. Date: Jan. 24, 2013

(65) Prior Publication Data
US 2014/0150962 A1    Jun. 5, 2014

Related U.S. Application Data

(60) Provisional application No. 61/509,250, filed on Jul. 19, 2011.

(51) Int. Cl.
*B32B 7/12* (2006.01)
*B32B 3/18* (2006.01)
(Continued)

(52) U.S. Cl.
CPC .................. *B32B 3/18* (2013.01); *B32B 5/18* (2013.01); *B32B 7/12* (2013.01); *B32B 38/10* (2013.01);
(Continued)

(58) Field of Classification Search
CPC ....... C09J 5/06; C09J 7/0246; C09J 2201/128
See application file for complete search history.

(56) References Cited

U.S. PATENT DOCUMENTS

RE24,906 E     12/1960  Ulrich
3,565,247 A *   2/1971  Brochman ............. B65D 65/38
                                                427/208.4
(Continued)

FOREIGN PATENT DOCUMENTS

GB          2340772          3/2000
JP        H03-064381 A       3/1991
(Continued)

OTHER PUBLICATIONS

Hussein et al. "New Technologies for Active Disassembly: Using the Shape Memory Effect in Engineering Polymers," Int. J. Product Development, 6, 431-449 (2008).
(Continued)

Primary Examiner — Victor Chang
(74) Attorney, Agent, or Firm — Steven A. Bern; Dena M. Ehrich

(57) ABSTRACT

A heat-debondable adhesive article having two opposing sides is provided that includes a shape-memory polymer sheet in its temporary strained shape that includes a plurality of slits therein and a first adhesive on one opposing side of the polymer sheet and a second adhesive on the other opposing side of the polymer sheet. The provided article, optionally, includes a first substrate in contact with the first adhesive and a second substrate in contact with the second adhesive. The article can be debonded by heating the article to a temperature equal to or greater than a transition temperature for the shape-memory polymer sheet.

21 Claims, 6 Drawing Sheets

(51) Int. Cl.
  *C09J 5/06* (2006.01)
  *C09J 7/02* (2006.01)
  *B32B 5/18* (2006.01)
  *B32B 38/10* (2006.01)
  *G09F 7/18* (2006.01)

(52) U.S. Cl.
  CPC ............... *C09J 5/06* (2013.01); *C09J 7/0246* (2013.01); *C09J 7/0264* (2013.01); *C09J 2201/128* (2013.01); *C09J 2201/20* (2013.01); *C09J 2201/606* (2013.01); *C09J 2205/302* (2013.01); *C09J 2423/046* (2013.01); *C09J 2465/006* (2013.01); *C09J 2475/006* (2013.01); *G09F 2007/1895* (2013.01); *Y10T 156/1062* (2015.01); *Y10T 156/1142* (2015.01); *Y10T 428/24802* (2015.01)

(56) References Cited

U.S. PATENT DOCUMENTS

| | | |
|---|---|---|
| 4,181,752 A | 1/1980 | Martens et al. |
| 4,303,485 A | 12/1981 | Levens |
| 4,436,858 A | 3/1984 | Klosiewicz |
| 4,619,979 A | 10/1986 | Kotnour et al. |
| 4,629,663 A | 12/1986 | Brown et al. |
| 4,737,559 A | 4/1988 | Kellen et al. |
| 5,139,832 A | 8/1992 | Hayashi et al. |
| 5,145,935 A | 9/1992 | Hayashi |
| 5,155,199 A | 10/1992 | Hayashi |
| 5,506,300 A | 4/1996 | Ward et al. |
| 5,589,246 A | 12/1996 | Calhoun et al. |
| 5,637,646 A | 6/1997 | Ellis |
| 5,641,567 A | 6/1997 | Brown |
| 5,665,822 A | 9/1997 | Bitler et al. |
| 5,804,610 A | 9/1998 | Hamer et al. |
| 5,888,650 A | 3/1999 | Calhoun et al. |
| 6,060,159 A | 5/2000 | Delgado et al. |
| 6,160,084 A | 12/2000 | Langer et al. |
| 6,274,228 B1 * | 8/2001 | Ramesh .................. B32B 27/08 428/213 |
| 6,388,043 B1 | 5/2002 | Langer et al. |
| 6,398,892 B1 * | 6/2002 | Noguchi .................. B24B 7/228 156/154 |
| 6,423,421 B1 | 7/2002 | Banaszak et al. |
| 6,773,535 B1 | 8/2004 | Wetzel |
| 7,173,096 B2 | 2/2007 | Mather et al. |
| 2001/0016613 A1 * | 8/2001 | Shimo .................. C08K 5/0016 523/456 |
| 2003/0108738 A1 * | 6/2003 | Alahapperuma ...... C09J 7/0217 428/343 |
| 2005/0244353 A1 | 11/2005 | Lendlein et al. |
| 2006/0041089 A1 | 2/2006 | Mather et al. |
| 2007/0009465 A1 | 1/2007 | Lendlein et al. |
| 2007/0172620 A1 | 7/2007 | Rodewald et al. |
| 2008/0019078 A1 * | 1/2008 | Arimitsu ............ H01L 21/6835 361/321.2 |
| 2009/0053478 A1 | 2/2009 | Sakashita |
| 2010/0252185 A1 | 10/2010 | Kiuchi et al. |
| 2010/0316845 A1 | 12/2010 | Rule et al. |
| 2011/0195248 A1 | 8/2011 | Kiuchi et al. |

FOREIGN PATENT DOCUMENTS

| | | |
|---|---|---|
| JP | 2000-136362 A | 1/1995 |
| JP | H07-024946 U1 | 1/1995 |
| JP | H08248887 | 9/1996 |
| JP | H1060391 | 3/1998 |
| JP | 2001-085360 A | 3/2001 |
| JP | 2003-301151 A | 10/2003 |
| JP | 2007-246848 A | 9/2007 |
| JP | 2011-500902 A | 1/2011 |
| WO | 00/40648 | 7/2000 |

OTHER PUBLICATIONS

PCT International Search Report for PCT/US2012/047274 dated Jan. 15, 2013, 4 pages.

* cited by examiner

DEBONDABLE ADHESIVE ARTICLE AND METHODS OF MAKING AND USING THE SAME

FIELD

This disclosure relates to adhesive articles that can be debonded by heat.

BACKGROUND

Adhesives, including pressure-sensitive adhesives and structural adhesives, are commonly used to bond parts to assembled articles in industries as varied as, for example, electronics, automobiles, abrasives, medical devices, and optics. For example, structural adhesives can be used in the automobile industry to bond parts such as rear view mirrors to windshields. Or optically clear adhesives can be used to bond optical films, electromagnetic shields, or even touch-sensitive films to electronic devices such as, for example, cellular phones, personal computers or computer tablets. Due to the high cost of the articles and the relatively low cost of the bonded films, it is sometimes desirable to remove the bonded part (debond it) for repair of the article, for modification of the article, for repositioning of the film on the article, or for recycling of the bonded article.

Reworkable and repositionable pressure-sensitive adhesives have been developed for this use. Typically, such adhesives adhere much more strongly to one substrate, such as an applied film, than to another substrate, such as a windshield or electronic display. Thus, they can be removed cleanly from the more expensive product and the applied film can be reworked or replaced. Adhesives are known that can be released by stretching the adhesive in one direction to reduce its adhesiveness. Some of these adhesives are sold under the trade designation, COMMAND, and are available from 3M, St. Paul, Minn.

Shape-memory can be used to debond pressure-sensitive adhesives. U.S. Pat. No. 5,888,650 (Calhoun et al.) teaches the use of a temperature-responsive carrier capable of changing its three-dimensional shape at a first transition temperature and a thermomorphic pressure-sensitive adhesive on at least a portion of at least one surface of the carrier. The thermomorphic pressure-sensitive adhesive is capable of changing its three-dimensional shape at a second transition temperature. By varying the initial shapes of topographies of carrier and adhesive and the relationship between the transition temperatures a wide variety of bonding and debonding properties can be provided.

SUMMARY

There is a need for heat debondable adhesive articles that can use conventional adhesives that do not necessarily have thermomorphic properties. There is a need for heat debondable articles that allow for repair or end-of-life disassembly of the same articles. There is also a need, for example in the electronics industry, for debondable adhesive articles that include overlays on electronic displays that have optical clarity and can be cleanly removed, for example, for reworking the electronic devices.

In one aspect, a heat-debondable adhesive article is provided that includes a shape-memory polymer sheet with an area having a strained temporary shape and an intrinsic shape, first and second opposing surfaces, and comprising at least one of a plurality of slits each having a width therein, and wherein the plurality of slits defines a total slit length, wherein if heated to or above a transition temperature range, the shape-memory sheet at least partially converts from its strained temporary shape to its intrinsic shape; a first adhesive having a first thickness and a first and second opposing surfaces, wherein the first adhesive comprises a pressure-sensitive adhesive, and wherein a substantial portion of the first opposing surface of the first adhesive layer is disposed upon a substantial portion of the first opposing surface of the shape-memory polymer sheet in its strained temporary shape; and a second adhesive having a second thickness, first and second opposing sides wherein a substantial portion of the first opposing side of the second adhesive is disposed upon a substantial portion of the second opposing side of the shape-memory polymer in its strained temporary shape. The provided debondable adhesive article can, optionally, include a first substrate having a surface in contact with a substantial portion of the second opposing surface of the first adhesive layer, and optionally, a second substrate in contact with a substantial portion of the second opposing side of the second adhesive.

The shape-memory polymer sheet can include physical crosslinks and, in some embodiments, can comprise thermoplastic urethanes or linear, high molecular weight polynorbornene. In other embodiments, the shape-memory polymer sheet can include covalent crosslinks such as can be found in epoxies, thermoset urethanes, acrylates, styrenic polymers, crosslinked olefins, or crosslinked ring-opening metathesis polymers. The shape-memory polymer sheet can be functionalized by, for example, corona treatment or chemical treatment. The plurality of slits can divide the shape-memory polymer sheet into two or more pieces and, in some embodiments, can include a cross-hatched pattern.

In another aspect, a method of preparing a debondable adhesive article is provided that includes providing a shape-memory polymer sheet having a strained temporary shape and an intrinsic shape, first and second opposing sides, comprising a plurality of slits each having a width therein, wherein if heated to or above a transition temperature, the shape-memory sheet at least partially converts from the strained temporary shape to its intrinsic shape; and a first adhesive having first and second opposing sides wherein a substantial portion of the first side is disposed upon the first opposing side of the shape-memory polymer; and applying the second opposing side of the first adhesive to a first substrate. The provided method can further include applying a first opposing side of a second adhesive to a second substrate; and disposing a substantial portion of the second opposing side of the second adhesive upon a substantial portion of the a second opposing side of the shape-memory polymer sheet In yet another aspect, a method of debonding an adhesive article is provided that includes providing an article that includes a first substrate having a first and a second opposing side comprising a shape-memory polymer sheet with a perimeter and having a strained temporary shape, and an intrinsic shape, a transition temperature, first and second opposing surfaces, and comprising a plurality of slits therein; a first adhesive layer having a first thickness and first and second opposing surfaces wherein a substantial portion of the first opposing surface of the first adhesive layer is disposed upon a substantial portion of the first opposing surface of the shape-memory polymer sheet in its strained temporary shape; and a first substrate having a surface in contact with a substantial portion of the second opposing surface of the first adhesive layer; and a second adhesive having a first thickness and first and second opposing surfaces wherein a substantial portion of the first opposing surface of the second adhesive layer is disposed upon the second opposing surface of the shape-memory polymer sheet in its strained temporary shape; and a second substrate having a surface in contact with a substantial portion of the second opposing surface of the second adhesive layer; heating the article to a first temperature above the first transition temperature so as to convert the shape-memory polymer sheet from its strained temporary shape to its intrinsic shape; and debonding the first substrate from the second substrate.

In this disclosure:

"elastomeric" materials refers to materials that can be described, for example, as amorphous or partly non-crystalline materials that can be stretched to at least twice their original length and that will retract rapidly and forcibly to substantially (generally at least about 75% or at least about 90%) of their original dimensions upon release of the force;

"intrinsic shape" refers to the shape to which a shape-memory polymer returns upon heating to or above its transition temperature;

"multifunctional" refers to crosslinking agents that possess two or more reactive sites such as free radically polymerizable ethylenically unsaturated groups, isocyanate groups, hydroxyl groups, thiol groups, or others;

"slit" or "slits" refer to a cut or slice in a film, such as the provided shape-memory film which can be completely within the film or can contact any of the perimeters of the film and, can have a width of no greater than the thickness of the adhesive disposed thereon unless specified otherwise such as the case where the adhesives do not aggressively adhere to each other;

"shape-memory transition temperature range" refers to the temperature range at or above wherein the shape-memory polymer changes dimensions from its strained temporary shape towards its intrinsic shape;

"strained temporary shape" refers to the shape of the shape-memory polymer when it has been heated above its transition temperature range and strained and then cooled below its transition temperature range; and "transition temperature range" refers to the shape-memory transition temperature range.

The provided heat-bondable adhesive articles can be used to debond conventional pressure-sensitive adhesives. These conventional pressure-sensitive adhesives may not necessarily have thermomorphic properties. The provided adhesive articles can allow for repair or end-of-life disassembly of products that have laminated sheets upon them, for example, overlays on electronic display panels. The provided debondable adhesive articles have optical clarity and can be cleanly removed from, for example, electronic devices.

The above summary is not intended to describe each disclosed embodiment of every implementation of the present invention. The brief description of the drawings and the detailed description which follows more particularly exemplify illustrative embodiments.

DETAILED DESCRIPTION

Figure 1A:
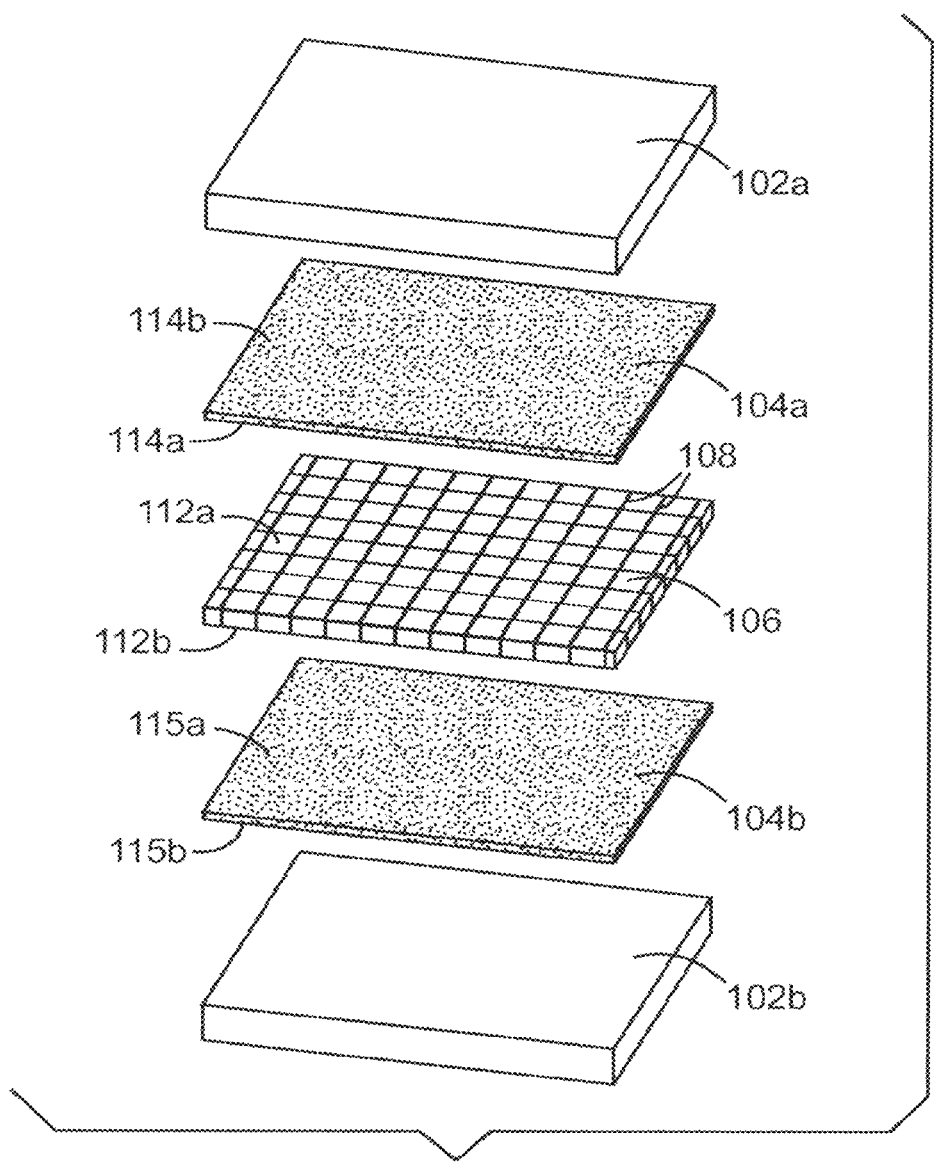
FIGS. 1A and 1B are exploded and side view illustrations respectively of an embodiment of a provided adhesive article having two substrates, one shape-memory polymer, and two adhesives.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

When a shape-memory material is initially formed it adopts an intrinsic shape. If the shape-memory material is then heated at or above a transition temperature ($T_{trans}$) it softens and will deform in response to an applied external stress. If the shape-memory material is cooled in this state, it will retain its strained temporary shape indefinitely. If the strained shape-memory material is reheated to a sufficiently high temperature, higher than the shape-memory transition temperature, the strained shape-memory material returns to its intrinsic shape.

Some polymeric materials are shape-memory materials. For convenience, such polymeric shape-memory materials will be referred to hereinafter as shape-memory polymers (SMPs). The mechanism behind SMPs lies in their molecular network structure, which typically contains physical or chemical crosslinks. In some cases, the physical crosslinks are formed by at least two separate phases. One phase with the highest thermal transition, $T_{upper}$, determines the temperature that must be exceeded to reestablish physical crosslinks responsible for the intrinsic shape. A second phase includes switching segments with the ability to soften above a certain transition temperature ($T_{trans}$) and is responsible for the temporary shape. In some cases, $T_{trans}$ is near the glass transition temperature ($T_g$), and in other cases it is near the melting temperature ($T_m$) of the SMP. Exceeding $T_{trans}$ (while remaining below $T_{upper}$) softens the switching segments, allowing the SMP to resume its intrinsic shape. Below $T_{trans}$, flexibility of the segments is at least partly limited.

In other cases, the polymer is chemically crosslinked. These chemical crosslinks are often covalent bonds. These chemical crosslinks can be formed as the polymer is initially cured, often by including a multifunctional monomer in the polymerization mixture. Alternatively, the chemical crosslinks can be formed after the initial polymerization, for example by radiation such as UV light or E-beam. The intrinsic shape of chemically crosslinked shape memory polymers is fixed as the crosslinks are formed, and this intrinsic shape of these chemically crosslinked polymers can usually not be changed even at extreme temperatures.

Useful SMPs may be physically and/or chemically crosslinked. Suitable physically crosslinked SMPs include linear block copolymers such as thermoplastic polyurethane elastomers with hard segments and soft switching segments. Multi-block copolymers can also serve as SMPs such as, for example, polyurethanes with polystyrene and poly(1,4-butadiene) blocks; ABA tri-block copolymers of poly(tetrahydrofuran) and poly(2-methyl-2-oxazoline); polyhedral oligomeric silsesquioxane (POSS)-modified polynorbornene; and polyethylene/Nylon-6 graft copolymers.

Examples of suitable chemically crosslinked shape-memory polymers include, but are not limited to, cross-linked high density polyethylene, crosslinked low density polyethylene, and crosslinked copolymers of ethylene and vinyl acetate.

Other examples of shape-memory polymers include: polyurethanes, polynorbornenes, polyethers, polyacrylates, polyamides, polysiloxanes, polyether amides, polyether esters, trans-polyisoprenes, polymethyl methacrylates, cross-linked trans-polyoctylenes, cross-linked polyethylenes, cross-linked polycyclooctenes, inorganic-organic hybrid polymers, copolymer blends with polyethylene and styrene-butadiene co-polymers, urethane-butadiene co-polymers, polymethyl methacrylate, polycaprolactone, and oligocaprolactone copolymers. Suitable shape-memory polymers also include those described in U.S. Pat. No. 5,506,300 (Ward et al.); U.S. Pat. No. 5,145,935 (Hayashi); U.S. Pat. No. 5,665,822 (Bitler et al.); U.S. Pat. No. 6,160,084 (Langer); U.S. Pat. No. 6,388,043 (Langer); U.S. Pat. No. 5,155,199 (Hayashi); U.S. Pat. No. 7,173,096 (Mather et al.); U.S. Pat. No. 4,436,858 (Klosiewicz); U.S. Pat. No. 6,423,421 (Banaszak); and U.S. Pat. Appl. Publ. Nos. 2005/244353 (Lendlein et al.), U.S. 2007/009465 (Lendlein et al.), and 2006/041089 (Mather et al.).

Shape-memory polymer sheets (or rolls) can be processed by heating the shape-memory polymer sheet to near or above the shape-memory transition temperature range or the particular material utilized, then orienting the sheet by stretching or tentoring it in at least one direction (typically down-web when a roll-to-roll process is used) followed by cooling the sheet to lock in the strain caused by the stretching. In some embodiments, the shape-memory polymer sheet can be oriented in two or more directions. For example, biaxially-oriented films can be made by simultaneous downweb and crossweb stretching of the polymer film near or above its transition temperature range followed by cooling. Biaxially-oriented films or sheets can have a maximum shrink tension in one direction. The provided heat-debondable adhesive article has a temperature at or above which the shrink tension of the shape-memory polymer is sufficiently high to cause a substantial change in one or more dimensions of the shaped-memory polymer sheet. The process of making and orienting shape-memory polymeric sheets is well known to those having ordinary skill in the art.

The provided heat-debondable adhesive article includes a shape-memory polymer sheet with an area having a strained temporary shape, first and second opposing surfaces, and includes at least one of a plurality of slits having a width therein and a total length. When heated to or above a transition temperature range, the shape-memory sheet at least partially converts from its strained temporary shape to its intrinsic shape. The intrinsic shape of the shape-memory polymer is the shape to which it returns after the shape-memory polymer is heated to or above a transition temperature range. However, as will be described later, it is possible to anneal some shape-memory polymers by heating them to a temperature close to but below the transition temperature range. Depending upon the composition of the shape-memory polymer, such annealing can cause the temporary shape of the shape-memory polymer to change and substantially eliminate the potential for small changes in shape at temperatures below the shape memory transition temperature range. This is discussed later in further detail herein.

Examples of commercially available thermoplastic SMPs include: polyurethanes available under the trade designation DIARY, including the MM, MP, MS, and MB (microbead powder) types series available from SMP Technologies, Inc. of Tokyo, Japan; elastic memory composites available under the trade designation EMC from Composite Technology Development, Inc. of Lafayette, Colo.; and polymers available under the trade designation VERIFLEX from Cornerstone Research Group, Inc. of Dayton, Ohio. The shape memory properties of acrylonitrile-butadiene-styrene (ABS) copolymers, polycarbonate, and polyethylene terephthalate are also disclosed by Hussein et al., in "New Technologies for Active Disassembly: Using the Shape Memory Effect in Engineering Polymers, " *Int. J. Product Development*, 6, 431-449 (2008). Additional examples of commercially available shape-memory polymer films that can be converted into various shapes such as, for example, sheets include those heat shrink films available under the trade designations CORTUFF, CRYOVAC, and OPTI from Sealed Air Inc. of Elmwood Park, N.J. Additional examples include shrink films available under the trade designations SHRINKBOX, VHG, EZ, AFG, ABL and PLAnet from Bemis Clysar of Oshkosh, Wis.

Figure 1B:
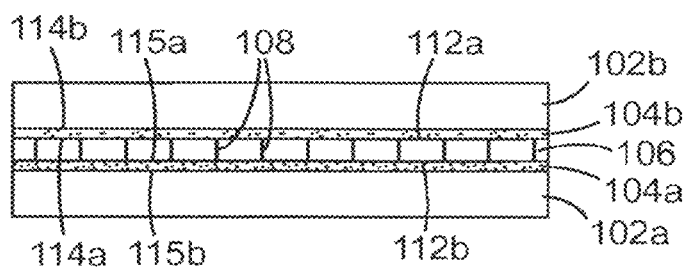

The provided debondable adhesive articles are best described in terms of illustrations of embodiments as shown in FIGS. 1A-B. FIGS. 1A and 1B show shape-memory polymer sheet 106 has first opposing surface 112*a* and second opposing surface 112*b*. Shape-memory polymer sheet 106 also has a plurality of slits 108 each having a width (depicted by black lines in FIGS. 1A and 2B) therein. First adhesive layer 104*a*, having first opposing surface 114*a* and second opposing surface 114*b*, is disposed between a surface of first substrate 102*a* and second opposing surface 112*a* of shape memory polymer sheet 106. A surface of first substrate 102*a* is in contact with a substantial portion of second opposing surface 114*b* of adhesive layer 104*a*. A substantial portion of first adhesive layer 104*a* is disposed upon first opposing surface 112*a* of first shape-memory polymer sheet 106. Second adhesive layer 104*b*, having first opposing surface 115*a* and second opposing surface 115*b*, is disposed between a surface of second substrate 102*b* and second opposing surface 112*b* of shape memory polymer sheet 106. A surface of second substrate 102*b* is in contact with a substantial portion of second opposing surface 115*b* of second adhesive layer 104*b*. A substantial portion of surface 115*a* of second adhesive layer 104*b* is also in disposed upon second opposing surface 112*b* of shape-memory polymer sheet 106.

The provided first adhesive layer and second adhesive layer can include pressure-sensitive adhesives, optically-clear adhesives, conductive adhesives, transfer adhesives, or any type of material that can make a bond between two substrates. The provided adhesives can include, for example, acrylic adhesives, epoxy adhesives, urethane adhesives, silicon adhesives, cyanate adhesives, cyanoacrylate adhesives, rubber adhesives, polyester adhesives, polyamide adhesives, styrenic adhesives, ethylene-diene block copolymer adhesives, and block copolymers of isoprene and styrene. The provided adhesives can be used alone or in combination with other adhesives either as an admixture or in layers. Furthermore, the provided adhesives can have additives such as foaming agents (before or after foaming), conductive particles, fillers, pigments, dyes, thickeners, hollow or solid glass beads, polymeric microspheres, or other additives commonly added to adhesives to change or enhance their physical properties.

Exemplary adhesives include structural adhesives such as VHB 4905, 4910, 4920, 4930, 4950, 4955, and 4959 Acrylic Foam Tapes, available from 3M Company, St. Paul, Minn. Provided adhesives can also include Double Coated Urethane Foam Tape 4008, stretch-release adhesives available, for example, under the trade designation COMMAND, such as 3M COMMAND Strips 17021P, both available from 3M Company. In other embodiments, the adhesive can include, for example, aluminum foil tapes such as 3M Aluminum Foil Tapes 425 or 431, High Temperature Aluminum Foil Tape 433, Heavy Duty Foil Tape 438, Vibration Damping Tapes 434, 4014, 435, or 436, Thermally Conductive Adhesive Transfer Tapes 8805, 8810, 8815, or 8820, or Reinforced Aluminum Foil/Fiber Tapes such as 363 or 1430, all available from 3M.

The provided heat-debondable adhesive article includes at least a first adhesive layer having a first thickness and first and second opposing sides. The first adhesive layer (and the second adhesive layer or subsequent adhesive layers, if present) is disposed upon a substantial portion of the first opposing surface of the shape-memory polymer sheet. "Disposed upon a substantial portion of . . . " in this disclosure means covering at least half of the surface. In some cases where the shape memory polymer sheet is divided by the slits into multiple pieces, the article can be made in the absence of a fraction of the pieces needed to cover the entire surface of the adhesive. Typically, the fraction of these missing pieces is less than 10 percent of the area of the adhesives.

In some embodiments, the shape-memory polymer sheet can include a chemical or surface modification that can increase the adhesion of an adhesive to the shape-memory polymer sheet. Exemplary chemical modifications can include primers such as solvent cast primers that can include halogenated polyolefin solutions such as 3M Tape Primer TP-94 or isocyanate-containing polymer solutions such as 3M Adhesion Promoter N200J (available from 3M, Saint Paul, Minn.). Any chemicals that increase the adhesion of adhesive to the shape memory polymer sheet are contemplated to be used herein. Additionally, surface-modification treatments such as corona treatment, especially nitrogen corona treatment, and other treatments mentioned elsewhere herein can be utilized.

The adhesive can include at least one crosslinked polymeric material having pressure sensitive adhesive properties. Pressure-sensitive adhesives typically include at least one elastomeric material. The term "crosslinked" refers to a three-dimensional polymeric network formed by the chemical bonds between at least two polymeric chains. This term includes pseudo-crosslinking resulting from ionic bonds or reinforcing physical interactions, for example. Thus, crosslinking can result from a wide variety of interactions, such as covalent bonds, ionic bonds, physical interactions, etc. Foamed adhesives may be used. When foamed adhesives are used they can be sandwiched between two non-foamed adhesives to increase surface area contact with a substrate.

Pressure sensitive adhesive (PSA) compositions are well known to those of ordinary skill in the art to possess properties including the following: (1) aggressive and permanent tack, (2) adherence with no more than finger pressure, and (3) sufficient ability to hold onto an adherend. Materials that have been found to function well as PSAs are polymers designed and formulated to exhibit the requisite viscoelastic properties resulting in a desired balance of tack, peel adhesion, and shear holding power. The adhesive in the provided debondable adhesive article is chosen to have high-temperature shear performance that is low enough to be overcome by the shrink tension of the shape memory polymer film. A balance of sufficient shape memory polymer shrink tension with the shear performance of the adhesive is necessary to achieve good debonding.

Suitable elastomeric materials for use in the pressure-sensitive adhesive layers are those that can be crosslinked and exhibit pressure sensitive adhesive properties either inherently or by compounding with commonly known tackifying resins. Typically, such crosslinkable pressure sensitive adhesive compositions include tackified natural rubbers, tackified block copolymers (e.g., styrene-isoprene-styrene, styrene-butadiene-styrene, and styrene-ethylene-butene-styrene block copolymers), tackified silicone elastomers, and inherently tacky materials such as poly(acrylates), poly (vinyl esters), and poly($\alpha$-olefins).

Poly(acrylates) are typically used in pressure sensitive adhesives. Poly(acrylates) are derived from alkyl acrylate and methacrylate monomers, which are specifically monofunctional unsaturated acrylate and methacrylate esters of non-tertiary alkyl alcohols, the alkyl groups of which preferably have about 4-11 carbon atoms. Such acrylate monomers, when homo-polymerized, generally have glass transition temperatures below about $-10°$ C. Examples of such monomers include, but are not limited to, those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof. Typical poly(acrylates) can be prepared from acrylate monomers including those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Useful acrylic adhesives are described, for example, in U.S. Pat. No. 4,181,752 (Martens et al.), U.S. Pat. No. 4,303,485 (Levens), U.S. Pat. No. 4,619,979 (Kotnour et al.), U.S. Pat. No. 4,737,559 (Kellen et al.), U.S. Pat. No. 5,637,646 (Ellis), U.S. Pat. No. 5,804,610 (Hamer et al.), U.S. Pat. No. 5,641,567 (Brown) and U.S. Re24,906 (Ulrich). A particularly useful adhesive includes a crosslinked copolymer of 80-99 wt. % of a $C_6$-$C_{10}$ alkyl acrylate, such as hexyl or isooctyl acrylate, and 1-20 wt. % of acrylic acid.

Acrylate or methacrylate or other vinyl monomers which, as homopolymers, have glass transition temperatures higher than about $-10°$ C. may, optionally, be utilized in conjunction with one or more of the acrylate or methacrylate monomers provided that the glass transition temperature of the resultant polymer is below about $-10°$ C. and that the resulting polymer has no melting point. Examples of vinyl monomers which, as homopolymers, have glass transition temperatures higher than about $-10°$ C. include, but are not limited to, tert-butyl acrylate, isobornyl acrylate, butyl methacrylate, vinyl acetate, acrylonitrile, and the like. These monomers can be used in various combinations.

Similarly, free radically copolymerizable amorphous polar monomers can also be employed, again provided that the glass transition temperature of the resultant polymer is below about −10° C. Examples of useful polar monomers include, but are not limited to, acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxy-ethyl) ammonium propionate betaine, trimethylamine methacrylimide, 1,1-dimethyl-1-(2,3-dihydroxypropyl)amine methacrylimide, N-vinyl pyrrolidone, N-vinyl caprolactam, acrylamide, t-butyl acrylamide, and dimethyl amino ethyl acrylamide. These monomers can be used in various combinations and in amounts such that the adhesive copolymer is not crystalline. Preferred polar monomers are those selected from the group consisting of monoolefinic monocarboxylic acids, monoolefinic dicarboxylic acids, acrylamides, N-substituted acrylamides, salts thereof, and mixtures thereof. Particularly preferred polar monomers are those selected from the group consisting of acrylic acid, methacrylic acid, N-vinyl pyrrolidone, and mixtures thereof.

Vinyl ester monomers suitable for use in the adhesive include, but are not limited to, those selected from the group consisting of vinyl 2-ethyl hexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids having about 1-14 carbon atoms which, as homopolymers, have glass transition temperatures below about −10° C. Preferred vinyl ester monomers are those selected from the group consisting of vinyl laurate, vinyl caprate, vinyl-2-ethyl hexanoate, and mixtures thereof.

Useful adhesives can be crosslinked. A variety of methods are available to crosslink the adhesive component. Crosslinking can be imparted during the monomer polymerization through the use of copolymerizable multifunctional crosslinking agents that are capable of copolymerizing with the monomer mixture. The adhesive (co)polymer can also be crosslinked following polymerization using other multifunctional crosslinking agents, such as metal ions and peroxides, which are reactive with moieties present on the already-formed polymer chains, or through the use of ionizing radiation, such as electron beams. Whatever crosslinking means are used, crosslinking may be done after coating on the deformed backing.

Typically, multifunctional crosslinking agents are used, particularly for the preferred acrylate (co)polymers and vinyl ester (co)polymers. Suitable multifunctional crosslinking agents include, but are not limited to, polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates. These multifunctional crosslinking agents can be used in a variety of combinations. Typical multifunctional crosslinking agents are those selected from the group consisting of acrylic or methacrylic esters of diols such as butanediol and hexanediol, triols such as glycerol, tetrols such as pentaerythritol, and mixtures thereof.

When such multifunctional crosslinking agents are used, one or more are used in an amount up to about 0.3 equivalent weight percent, preferably up to about 0.2 equivalent weight percent, more preferably up to about 0.15 equivalent weight percent, and most preferably up to about 0.1 equivalent weight percent, of the total polymerizable composition. Typically, no less than about 0.02 equivalent weight percent, of a multifunctional crosslinker should be present to provide sufficient crosslink density to support the primary shape. The "equivalent weight percent" of a given compound is defined as one hundred times the number of equivalents of that compound divided by the total number of equivalents in the total composition, wherein an equivalent is the number of grams divided by the equivalent weight. The equivalent weight is defined as the molecular weight divided by the number of polymerizable groups in the monomer (in the case of those monomers with only one polymerizable group, equivalent weight is the molecular weight).

Initiators can also be used to enhance the rate of polymerization and/or crosslinking. Suitable free radical initiators include thermally activated initiators such as azo compounds, hydroperoxides, peroxides and the like, and photoinitiators. Photoinitiators can be organic, organometallic, or inorganic compounds, but are most commonly organic in nature. Examples of commonly used organic photoinitiators include benzoin and its derivatives, benzil ketals, acetophenone, acetophenone derivatives, benzophenone, and benzophenone derivatives. The initiator is generally used in an amount ranging from about 0.01 percent up to about 10 percent by weight of the total polymerizable mixture, typically up to about 5 percent.

The provided debondable adhesive article is typically applied to a substrate having a surface in contact with a substantial portion of the second opposing surface of the adhesive layer. The substrate can be any material or article to which a bond is formed and from which it is desired to debond the adhesive. Substrates can be flat or have a curved surface. They can include materials such as polymers, metals, composites, ceramics, glass, paper, coated paper, semiconductor wafers, wood, and other articles. The materials can include additional coatings such as, for example, paints, ceramic coatings, release coatings, moisture-prevention coatings, and microstructures. Exemplary articles include building materials, electrical and electronic parts, motor vehicles, and other parts and members. In specific embodiments, the articles can include displays for electronic articles such as personal computers, personal notebooks, cellular phones, personal data assistants, and other mobile hand-held electronic devices. The articles can also include touch-sensitive panels. In some embodiments, the substrate can be a release liner in contact with one surface of the adhesive layer.

The provided debondable adhesive article can include an energy-absorbing layer. This layer can be capable of absorbing ultraviolet, visible, infrared, magnetic, resistive, electron-beam or other types of energy and can cause the temperature of the article to increase to or above the transition temperature range. In some embodiments, the energy-absorbing layer can be an energy-absorbing layer such as a foil of aluminum or copper. In some embodiments, the energy-absorbing layer can also be the substrate. For example, aluminum foil can be the substrate. In other embodiments, the energy-absorbing layer can be part of a composite in which energy-absorbing materials are embedded or bonded into the composite matrix.

The provided debondable adhesive article can include a shape-memory polymer sheet having at least one of a plurality of slits each having a width therein. The slits can be introduced into the shape-memory polymer sheet by cutting with a knife, die, laser, or any other article that is well known to cut polymeric sheets. The slits can be in any shape and can start and end within the perimeter of the sheet or can extend through the perimeter of the sheet at one or more ends. Exemplary slit patterns are illustrated in FIGS. 2A-2R.

Figure 2A:
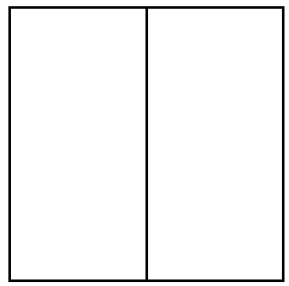
FIGS. 2A-2R are top view illustrations of shape-memory polymer sheets having a plurality of slits therein that are useful in embodiments of the provided adhesive articles and methods.
Figure 2B:
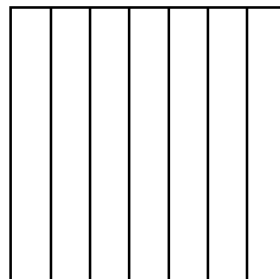

FIGS. 2A and 2B are illustrations of slits that run parallel to one perimeter edge from one perimeter edge to the opposite perimeter edge. FIGS. 2C through 2F are illustrated slit patterns that include rectilinear cross-hatch patterns extending from one perimeter edge to the opposite perimeter edge in two directions. FIG. 2G illustrates a spiral continuous slit. FIG. 2H illustrates concentric rectangular slits. FIG. 2I illustrates several series of aligned slits that serve as perforations and run parallel to one perimeter edge from one perimeter edge to the opposite perimeter edge. FIG. 2J is an illustration of a slit pattern that extends in from two opposite perimeters. FIGS. 2K and 2L illustrate diagonal slits extending from one perimeter to another perimeter. FIGS. 2M though 2P illustrate slit patterns on rolls of shape-memory polymer that include parallel perimeter-to-perimeter slits (FIG. 2M), diagonal perimeter-to-perimeter slits (FIG. 2N), and rectilinear perimeter-to-perimeter slits (FIGS. 2O and 2P). The shape-memory polymer film can also have slits that have width such as those shown in the comb patterns illustrated by FIG. 2Q and FIG. 2R, which are particularly useful with adhesive layers that do not aggressively adhere to each other. In these patterns, as stated above, the width of the slit should not exceed the thickness of the adhesive disposed upon it unless the adhesives do not aggressively adhere to each other. The total length of the first plurality of slits is sufficient to provide at least 0.35 cm of slit length for every square cm of area of the shape-memory polymer sheet in its strained temporary shape. The term "slit length" describes the longest dimension of an opening or slit in the shape memory polymer sheet. The "total slit length" is the sum of the plurality of slit lengths in the shape-memory polymer sheet.

Typically, the ratio of the total length of the plurality of slits (or total slit length) to the area of the shape-memory polymer sheet is greater than 0.35 cm/cm$^2$. This ratio can be greater than about 0.40 cm/cm$^2$, greater than about 1.0 cm/cm$^2$, or even greater.

Figure 3:
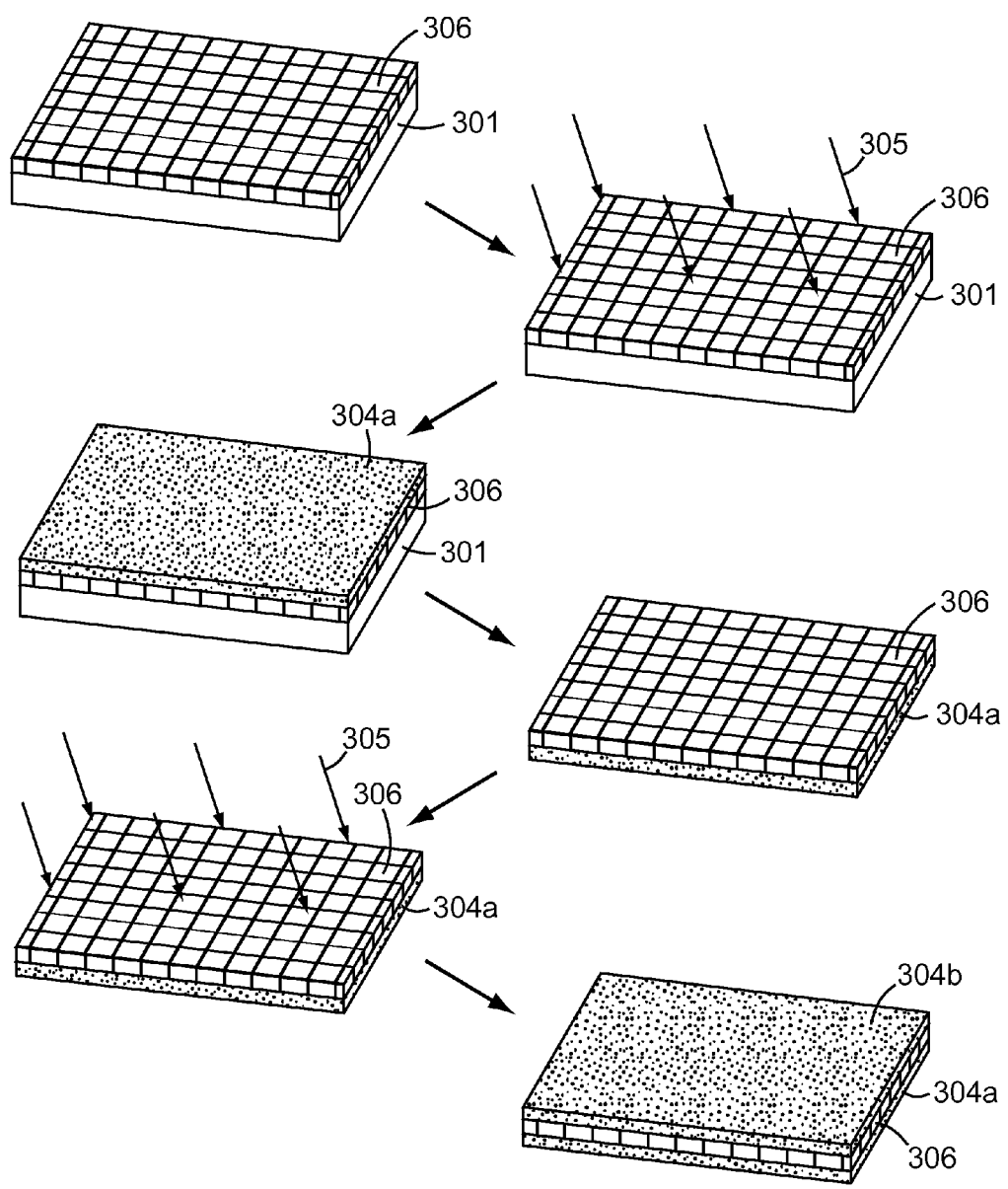
FIG. 3 is a series of illustrations depicting an embodiment of a method of preparing a provided adhesive article.

One embodiment of a method of preparing the provided debondable adhesive article is schematically illustrated in FIG. 3. Second opposing side of shape-memory polymer sheet 306 including a plurality of slits is disposed upon carrier sheet 301. Carrier sheet 301 can be any sheet that can hold shape-memory polymer sheet 306 during slitting and adhesive coating or lamination. In one embodiment, carrier sheet 301 is a polyurethane foam tape. First opposing side of shape memory polymer sheet 306 is surface modified by, in the illustrated embodiment, corona treatment 305. Then first adhesive 304a is disposed upon the surface-modified first opposing side of shape-memory polymer sheet 306. First adhesive 304a can be directly coated upon shape-memory polymer sheet 306 as a solvent-based adhesive or as a solventless adhesive using any of the coating methods known to those of ordinary skill in the art as long as the applied adhesive does not have a temperature which will relax the shape-memory polymer. Alternatively, first adhesive 304a can be applied as a transfer tape—having been coated on a sacrificial liner in a previous step or purchased as a transfer tape. First adhesive 304a can be crosslinked, if desired, before or after transfer.

Carrier 301 is then removed and the article turned upside down as shown in FIG. 3. The second side of shape-memory polymer sheet 306 is then again surface modified with corona treatment 305 as shown in the schematic illustration, followed by coating or lamination of second adhesive 304b to yield the article shown at the end of the scheme in FIG. 3 where shape-memory polymer sheet 306 is coated on one side with first adhesive 304a and on the second side with second adhesive 304b. The adhesive article can then be laminated to a first substrate and a second substrate to form a provided debondable adhesive article as shown in the first schematic in FIG. 4B.

Figure 4A:
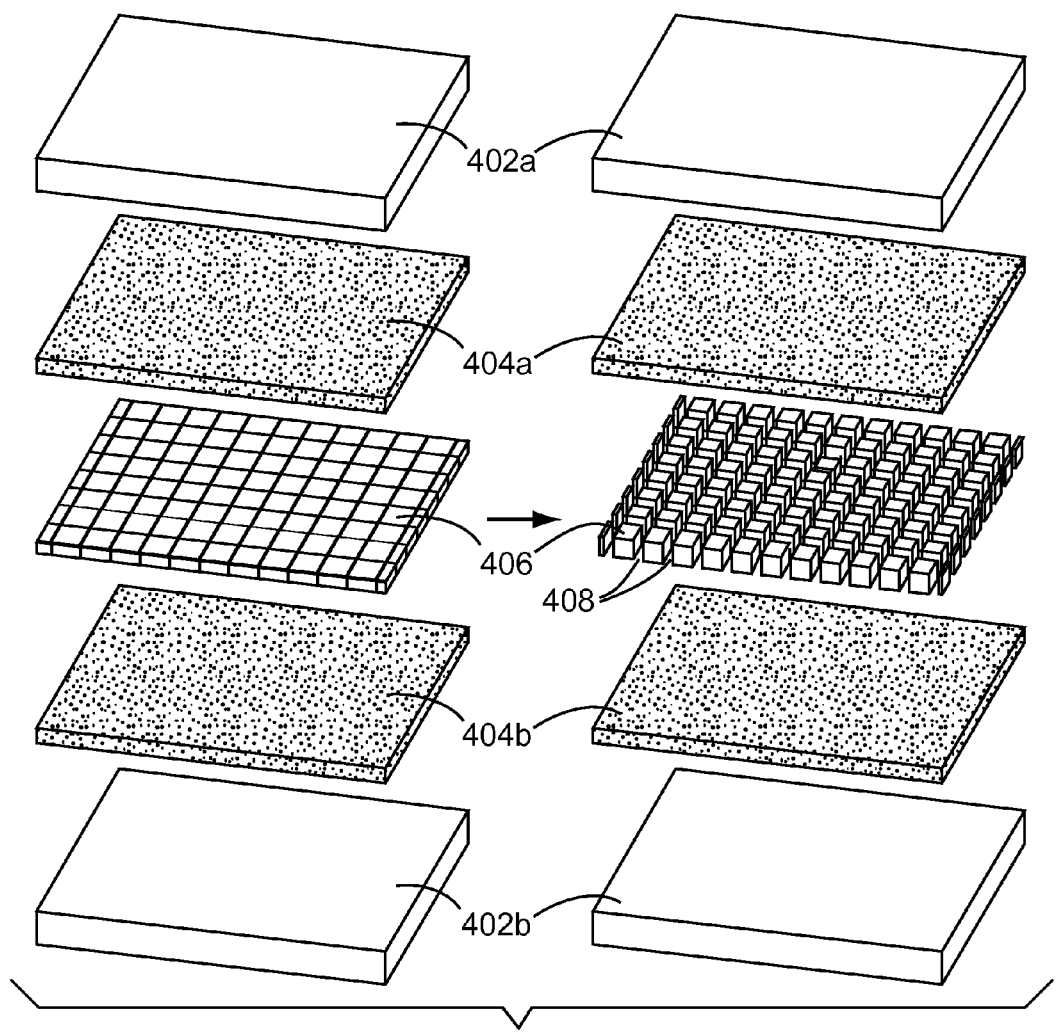
FIGS. 4A and 4B are exploded and side view illustrations of an embodiment of a method of debonding provided adhesive articles.
Figure 4B:
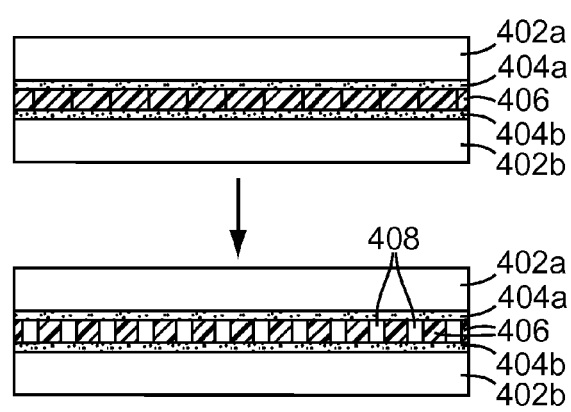

A method of debonding an adhesive article is also provided. An embodiment of the provided method is illustrated schematically in FIGS. 4A and 4B. FIG. 4A on the left is an exploded perspective view of a provided debondable adhesive article. This figure shows shape-memory polymer sheet 406 that includes a plurality of slits with first adhesive 404a disposed on a first opposing surface of shape-memory polymer sheet 406 upon which is disposed a first substrate 402a. This figure also shows second adhesive 404b disposed upon a second opposing surface of shape-memory polymer 406 and in contact with second substrate 402b. FIG. 4A on the right is the same article after heating above the transition temperature range of shape-memory polymer sheet 406. Upon heating, shape-memory polymer sheet 406 shrinks in the direction of the plane of the sheet and expands in the normal direction forming small blocks of polymer as shown in 408.

Figure 5:
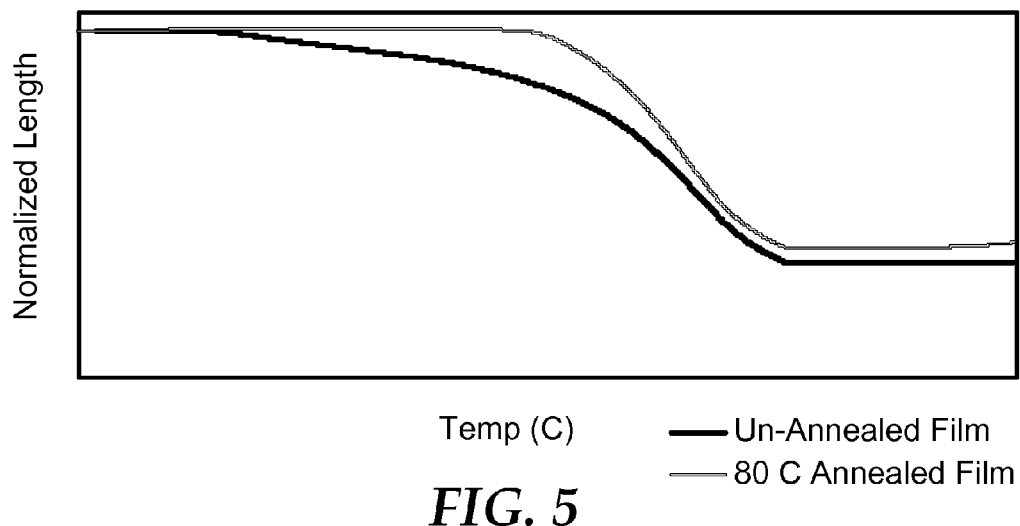
FIG. 5 is a graph of temperature vs. length of an unannealed and annealed shape-memory polymer sheet useful in the provided adhesive articles and methods.

With some shape-memory polymeric materials, such as, for example, those based on polyethylene including CORTUFF or SHRINKBOX, it is possible to modify the thermal shape change profile of the polymer by heating it in an unconstrained state to a temperature below that of its shape-memory transition temperature range and allowing the material to anneal. This causes the temporary shape of the polymer to change to a less-strained shape, but does not substantially affect the intrinsic shape of the polymer. It also prevents the polymer from spontaneously undergoing small shape changes at temperatures below the annealing temperature and below the shape memory transition temperature range. FIG. 5 shows this behavior for CORTUFF film. The dark line in FIG. 5 shows the change in shape of un-annealed CORTUFF film. In this trace, the shape memory transition temperature range is near the steepest slope of the plotted line, and it shows that there is a gradual change in length at temperatures well below this transition temperature range. In contrast, the lighter plotted line shows the behavior of CORTUFF film that has been annealed slightly below its transition temperature range. In this case, the transition temperature range is substantially the same as the case of the un-annealed film, but there is no substantial change in length until a temperature near the transition temperature range.

In some embodiments, where the first adhesive and the second adhesive have poor inter-adhesion or are significantly incompatible it is possible to have slits that are wider than the thickness of the adhesive. For example, double-sided adhesive tapes that have two different non-adhering or incompatible adhesives coated on each side can be used with slits wider than the thickness of the respective adhesives. FIGS. 2Q and 2R are comb-like structures that can be used in the provided debondable adhesive articles with double-stick or double-sided adhesive tapes.

In another embodiment, it is contemplated that a shape-memory polymer sheet containing slits can be adhesive coated on only one side and used to form a butt splice between two adjacent substrates. In this case the butt splice can be removed by heating the shape memory polymer sheet above its transition temperature range but only needs to be adhesive coated on one side.

Objects and advantages of this invention are further illustrated by the following examples, but the particular materials and amounts thereof recited in these examples, as well as other conditions and details, should not be construed to unduly limit this invention.

EXAMPLES

General Procedure for Slitting the Shrink Film and Preparing the Multilayer Films Onto a ¼ in (6.35 mm.) thick glass pane was laminated a 12 in (305 mm) length of 3M urethane foam tape 4016 on top of which a 12 in (305 mm) length of 3M POST-IT paper (equivalent to POST-IT Craft Paper C8512) was laminated and lastly a 12 in (305 mm) length of primed shrink film. The 3M urethane foam tape 4016 and POST-IT paper acted as a carrier while the shrink film was slit into the prescribed pattern using razor blades. A pressure-sensitive adhesive (PSA) tape layer was then laminated onto the slit shrink film. The shrink film and PSA laminate was then peeled off at a 90° angle leaving behind the POST-IT paper and the urethane foam tape. The exposed face of the shrink film was then laminated to an additional PSA tape layer.

90° Peel Adhesion Test

One face of the multilayer tape containing the shrink film was applied to a stainless steel coupon measuring 75 mm×125 mm×1.5 mm. The tape measured 25 mm×100 mm unless otherwise indicated. A piece of anodized aluminum foil measuring 200 mm×28 mm×0.13 mm (available from Lawrence and Frederick, Streamwood, Ill.) was then applied to the other face of the multilayer tape. The assembly was then placed in an oven at 80° C. for 1 hour under a pressure of 1.6 N/cm². A portion of specimens from each sample set were then heated in a 110° C. oven for 30 minutes, and the other specimens were left unheated to be tested as controls. After cooling to room temperature, the specimens were allowed to rest for at least 24 hours. The samples were mounted into a 90° peel constant angle fixture and then tested in a 90° peel mode at 305 mm/min using an Instron Model 4501 load frame equipped with a 1000 N load cell. The force values from the peel displacements of 25 mm to 75 mm were averaged to give peel strength values.

Normal Tensile Adhesion Test

The test substrates were T-shaped pieces of aluminum with a base measuring 25 mm×64 mm. Two such substrates were adhered together by contacting a multilayer film from the current invention with the center of the base of each aluminum substrate. Unless otherwise indicated, each piece of tape measured 25 mm×25 mm, and eight specimens were prepared for each tape design. After bonding, the specimens were left in an environment of 23° C. and 50% relative humidity for 24 hours. Four of the specimens were then heated in a 110° C. oven for 30 minutes. After an additional 24 hours, all eight samples were tested to failure at room temperature on a Sintech load frame with a 1000 lbf load cell in a normal tensile mode at a rate of 51 mm/minute. The average peak load for the unheated specimens and the average peak load for the heated samples were each calculated.

General Method For Adhesion Area Measurement

After the adhesion testing of the samples that had been heated, the exposed pieces of shrink film were colored with black ink or fluorescent yellow ink using pens. In the case of black ink, the samples were then photographed under visible light, and in the case of the fluorescent ink, the samples were photographed under UV light. The image files were analyzed by measuring the number of pixels within a rectangular area defining the size of the piece of tape and by measuring the number of pixels that had been inked either black or fluorescent. The ratio of the number of pixels in the inked area divided the number of pixels in the initial tape area was then used to define the adhesion area.

Example 1

A 160 mm wide roll of CORTUFF 200 (a 51 μm thick polyethylene shrink film from Sealed Air Corporation, Duncan, S.C.) was nitrogen corona treated at 2.0 J/cm². An 18 in (460 mm) section was primed with a solution of 3M Tape Primer 94 at a concentration of 3% solids in toluene using a #8 Meyer rod and dried at 80° C. for 1 hr. A portion of the sample was slit into strips 1.6 mm wide in the lengthwise direction and 6.4 mm wide in the crosswise direction to produce rectangles. A 4 in (102 mm) length of 1 in wide (25.4 mm) 3M VHB tape RP16 was laminated to each side of the treated CORTUFF film. The resulting assembly was tested using the 90° peel adhesion test, and the results are reported below.

Example 2

An 457 mm×160 mm section of CORTUFF film that was nitrogen corona treated at 2.0 J/cm² was primed with 3M adhesion promoter N200J at a concentration of 3% solids using a #8 Meyer rod and dried at 80° C. for 1 hr. A portion of the sample was slit in each direction (lengthwise and crosswise) to produce squares of 3.6 mm on a side. The shrink film was laminated between 3M VHB tape 5930 and DS4 transfer tape. The sample was then tested using the 90° peel adhesion test, and the results are shown below.

TABLE 1

90° Peel Testing of Examples 1-2

| 90° Peel | Temperature | Avg Peel Force (N/cm width) |
|---|---|---|
| Example 1 | Unheated | 15.1 |
| Example 1 | After 110° C. | 5.6 |
| Example 2 | Unheated | 41.9 |
| Example 2 | After 110° C. | 14.0 |

Example 3

CORTUFF 200 film was treated with a hand-held corona treater (Electro-Technic Products Inc.; Chicago, Ill.; BD-20AC; Laboratory Corona Treater with line filter 115V) on both faces and slit in each direction (lengthwise and crosswise) to produce squares of 3.6 mm on a side. The slit shrink film was laminated between 3M COMMAND strips 17021P medium white (54 mm wide) and 3M thermally conductive tape 8815 (54 mm wide). The resulting construction was then used to attach four triangular ceramic tiles (54 mm to a side) to a steel plate with the COMMAND adhesive against the steel. After bonding, the specimens were left in an environment of 23° C. and 50% relative humidity for 24 hr. A propane torch was held to the center tile for 30 seconds, at which time the outside face of the tile was measured to be at 120° C. Adjacent (unheated) tiles only reached 30-65° C. in this time. The tile was then allowed to cool for 4 hours before being removed in a normal tensile mode at a rate of 51 mm/min with a peak load of 21 N. The sample debonded at the CORTUFF/COMMAND interface, and the COMMAND layer was then peeled cleanly from the steel by hand. Adjacent (unheated) tiles averaged a peak load of 360 N in normal tensile mode and failed at the COMMAND/Steel interface.

Example 4

An 457 mm×160 mm section of CORTUFF film that was nitrogen corona treated at 2.0 J/cm$^2$ was primed with 3M adhesion promoter N200J coated at a concentration of 1.5% solids using a #20 Meyer rod and dried at 80° C. for 1 hr. A portion of the corona and primed CORTUFF film layer was slit into two 0.5 in strips in the lengthwise direction as shown in FIG. 2A. The tape was tested using the normal tensile adhesion test, and the average peak loads for the heated and unheated samples are reported below.

Comparative Example 1

Comparative Example 1 was constructed and tested as described in Example 4, except the CORTUFF layer was not slit.

Example 5

Example 5 was constructed and tested as described in Example 4, except that the CORTUFF layer was slit into seven 3.56 mm strips in the lengthwise direction as shown in FIG. 2B.

Example 6

Figure 2C:
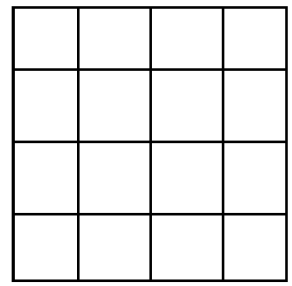

Example 6 was constructed and tested as described in Example 4, except that the CORTUFF layer was slit into strips in each direction (lengthwise and crosswise) to produce squares of 6.35 mm on a side as shown in FIG. 2C.

Example 7

Figure 2D:
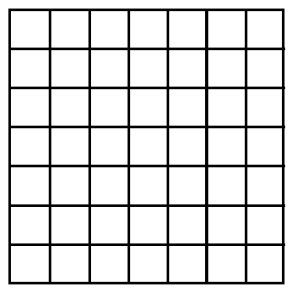

Example 7 was constructed and tested as described in Example 4, except that the CORTUFF layer was slit into strips in each direction (lengthwise and crosswise) to produce squares of 3.56 mm on a side as shown in FIG. 2D.

Example 8

Figure 2E:
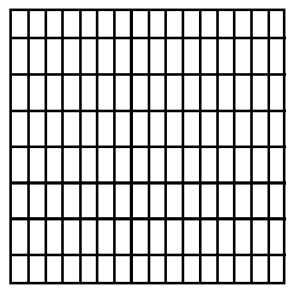

Example 8 was constructed and tested as described in Example 4, except that the CORTUFF layer was slit into strips 1.6 mm wide in the lengthwise direction and 3.2 mm wide in the crosswise direction to produce rectangles as shown in FIG. 2E.

Example 9

Figure 2F:
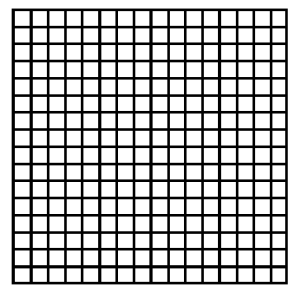
Figure 2G:
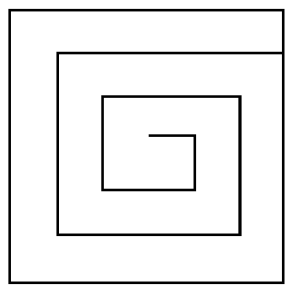
Figure 2H:
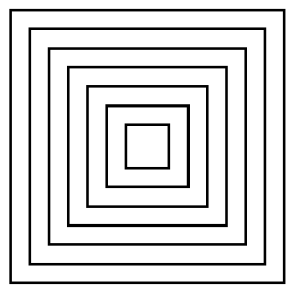
Figure 2I:
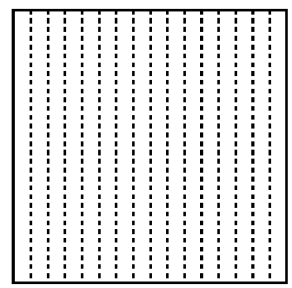
Figure 2J:
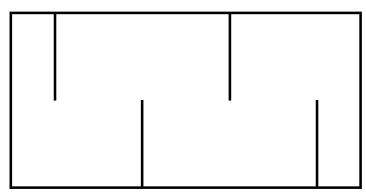
Figure 2K:
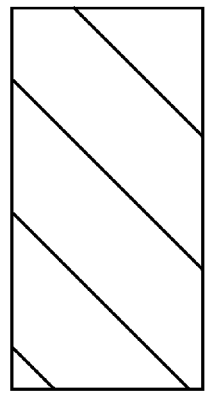
Figure 2L:
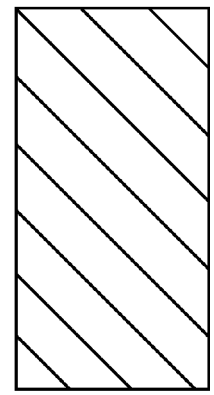
Figure 2M:
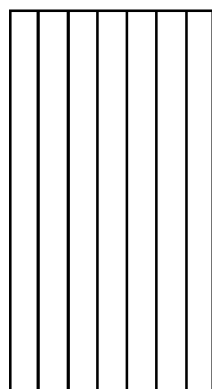

Example 9 was constructed and tested as described in Example 4, except that the CORTUFF layer was slit into strips 1.6 mm wide in each direction (lengthwise and crosswise) to produce squares of 1.6 mm on a side as shown in FIG. 2F.

Example 10

Example 10 was constructed as described in Example 4, except that the CORTUFF layer was slit into a single continuous spiral pattern of a strip 4.24 mm wide as shown in FIG. 2G. Two unheated samples were tested for normal tensile adhesion, and two samples that had been heated to 110° C. were tested for normal adhesion with the results shown in Table 2.

Example 11

Example 7 was constructed as described in Example 4, except that the CORTUFF layer was slit into concentric squares as shown in FIG. 2H with 2.12 mm between the edges of each successive square. Two unheated samples were tested for normal tensile adhesion, and two samples that had been heated to 110° C. were tested for normal adhesion with the results shown in Table 2.

Example 12

Example 12 was constructed as described in Example 4, except the CORTUFF layer was perforated to form discontinuous slits in the cross-web direction 1.59 mm wide as shown in FIG. 2I. In each row of slits, at least half of the total length was perforated. Two unheated samples were tested for normal tensile adhesion, and two samples that had been heated to 110° C. were tested for normal adhesion with the results shown in Table 2.

After each of the Examples 4-11 and Comparative Example 1 was measured for tensile force adhesion after exposure to 110° C. as described above, the area of adhesive covered by the shape-memory polymer sheet (CORTUFF) was measured as a percent of adhesive covered. Additionally, the total lengths of the initial, unshrunken slits per unshrunken initial area of shape memory polymer sheet, after annealing, were calculated. The data are displayed in Table 2. Slitting of the shrink film decreased the area of adhesion after heating causing a corresponding decrease in the level of adhesion.

TABLE 2

Room Temperature and 110° C. Tensile Force, Adhesion Area and Ratio of Total Slit Length/Area of Shape-Memory Polymer Sheet

| Sample | Unheated Tensile (N/cm$^2$) | After 110° C. Tensile (N/cm$^2$) | Adhesion Area (%) | Slit Length/Area (cm/cm$^2$) |
|---|---|---|---|---|
| Comp. Ex. 1 | 70 | 46 | 81 | 0 |
| Ex. 4 | 61 | 42 | 80 | 0.4 |
| Ex. 5 | 57 | 33 | 61 | 2.4 |
| Ex. 6 | 61 | 30 | 53 | 2.4 |
| Ex. 7 | 60 | 34 | 42 | 4.7 |
| Ex. 8 | 65 | 38 | 29 | 8.7 |
| Ex. 9 | 64 | 42 | 31 | 11.8 |
| Ex. 10 | 65 | 36 | 56 | 1.6 |
| Ex. 11 | 65 | 43 | 53 | 3.9 |
| Ex. 12 | 65 | 43 | 62 | 3.0 |

Example 13

Pellets of thermoplastic polyurethane resins DiARY MM3520 (18.75 g) and DiARY MM9020 (6.25 g) (both available from SMP Technologies, Inc., Tokyo, Japan) were mixed for five minutes at 180° C. in a Brabender mixer (Prep Center Type D-51 from C.W. Brabender Instruments, Inc., South Hackensack, N.J.). The resulting polymer was pressed into sheets in a hydraulic press at 146° C. (Model 2699 from Carver Inc., Wabash, Ind.) into a film 0.7 mm thick. A 25 mm×63 mm piece of this film was heated in a 70° C. oven for 15 minutes and was then stretched by hand to an elongation of 180%. The resulting strip was 15 mm wide and 0.5 mm thick. Slits that were 7 mm in length were made along each edge of the strip such that the slits were orthogonal to the length of the strip and were spaced 6 mm apart as shown in FIG. 2J. The slits on opposite edges of the film were offset by 2 mm. VHB RP16 foam tape was laminated to both faces of the film. The film was then cut into four pieces that were each 25 mm long, and those pieces were used to perform normal tensile adhesion testing. Two of the four specimens were heated to 50° C. for 30 minutes and the other two were left unheated. The unheated specimens showed an average adhesion of 70 N/cm$^2$, and the heated specimens showed an average adhesion of 34 N/cm$^2$. The area of adhesion of the heated samples had decreased to 57% of its original value as measured over the footprint of the adhesive.

Example 14

4 in (102 mm) primed shrink film identical to that used in Example 4 was slit into the comb pattern illustrated in FIG. 2Q. Two parallel strips of ½ in (12.7 mm) wide 3M SCOTCH Permanent Double-Sided Tape 137 were laminated to the slitted shrink film with the outside face of the tape adhered to one face of the shrink film. The opposite face of the shrink film was then laminated to the inside face of two parallel strips of the SCOTCH double-sided tape. The entire construct was then cut into two 5×2.5 cm strips and adhered to a clean stainless steel plate on the bottom and an 8 in (203 mm) strip of anodized aluminum on the top. After bonding, the specimens were left in an environment of 23° C. and 50% relative humidity for 24 hours. One of the specimens was then heated in a 110° C. oven for 30 minutes. After an additional 24 hours, both samples were tested to failure at room temperature on an Instron load frame with a 1000 N load cell in a 90° peel mode at a rate of 305 mm/minute. The peel force for the unheated sample was 7.6 N/cm width and the peel force for the heated sample was 1.5 N/cm width. The area coverage of the shrink film on the adhesive before shrinking was 64% and after shrinking was 15%.

Example 15

Example 15 was constructed and tested as described in Example 14 except that the CORTUFF layer was slit into the branched pattern illustrated in FIG. 2R. The peel force for the unheated sample was 5.3 N/cm width and the peel force for the heated sample was 0.96 N/cm width. The area coverage of the shrink film on the adhesive before shrinking was 64% and after shrinking was 15%.

Example 16

CORTUFF 200 film was laminated to a strip of Urethane Foam Tape 4008, 3.2 mm thick by 2.54 cm wide. The CORTUFF film was then treated with a hand-held corona treater (Electro-Technic Products Inc.; Chicago, Ill.; BD-20AC; Laboratory Corona Treater with line filter 115V). The CORTUFF film was then sliced into 7 strips per inch in each direction (lengthwise and crosswise) to produce squares of 3.56 mm on a side. VHB 4920, 0.38 mm thick by 2.54 cm wide (available from 3M Corporation) was laminated to the treated CORTUFF and placed under a pressure of 0.7 N/cm$^2$ for 45 minutes. The VHB was then peeled away from the urethane tape and the CORTUFF was verified to have adhered to the VHB rather than the urethane tape. The other side of the CORTUFF was then corona treated and a second layer of VHB 4920 was laminated to it.

The resulting multilayer tape was subjected to normal tensile testing. All specimens failed at the interface between one of the VHB tapes and the heat shrink film. The average peak load for the unheated sample was 124 N/cm$^2$, and the average peak load for the heated sample was 20 N/cm$^2$. The failed specimens from the sample that had been heated were photographed, and the average area covered by the shrunken CORTUFF was found to be 23% of the area covered by the VHB.

Testing of Examples 17-22

Examples 17-22 were tested using a modification of Normal Tensile Adhesion Test Method described above. Five specimens from each tape design were heated to 110° C., and during the heating, each specimen was loaded with a 1 kg weight to apply a normal compressive force during the heating.

Example 17

An article was made according to Example 16, except that the CORTUFF layer was slit into 13 mm strips at a 45° pitch to the lengthwise direction as illustrated in FIG. 2K.

Comp. Example2

An article was made according to Example 17 except that the CORTUFF layer was not slit.

Example 18

An article was made according to Example 16, except that the CORTUFF layer was slit into 6.4 mm wide strips at a 45° pitch to the lengthwise direction as shown in FIG. 2L.

Example 19

An article was made according to Example 16, except that the CORTUFF layer was slit into 3.6 mm wide lengthwise strips as shown in FIG. 2M.

Example 20

Figure 2N:
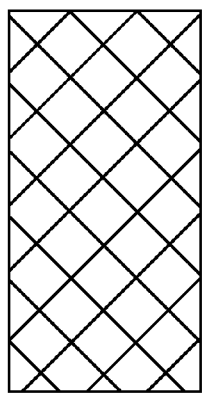
Figure 2O:
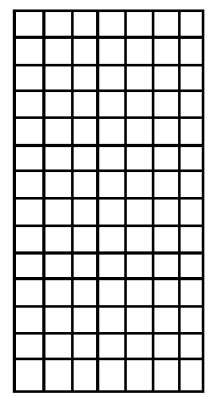
Figure 2P:
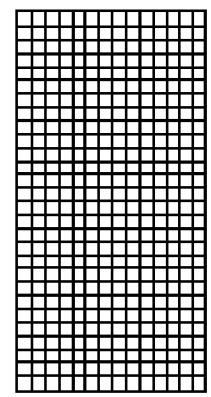
Figure 2Q:
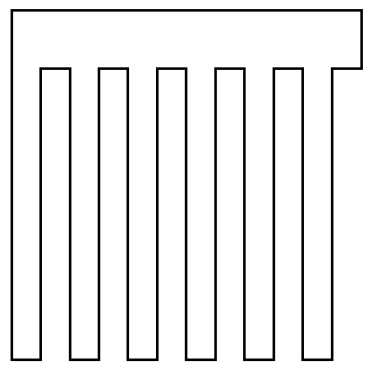
Figure 2R:
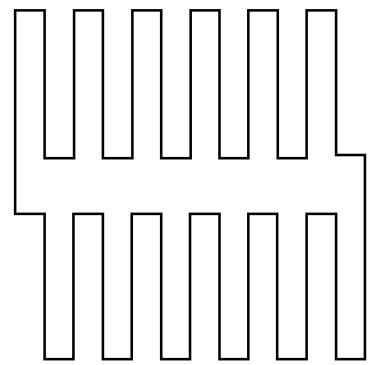

An article was made according to Example 16, except that the CORTUFF layer was slit into 6.4 mm wide strips at +45° and −45° pitch to the lengthwise to produce squares of 6.4 mm on a side as shown in FIG. 2N.

Example 21

An article was made according to Example 16, except that the CORTUFF layer was slit into 7 strips per 25 mm in each direction (lengthwise and crosswise) to produce squares of 3.6 mm on a side as shown in FIG. 2P.

Example 22

An article was made according to Example 16, except that the CORTUFF layer was slit into 14 strips per 25 mm in each direction (lengthwise and crosswise) to produce squares of 1.8 mm on a side as shown in FIG. 2O.

After Examples 17-22 and Comparative Example 2 were tested for normal tensile force adhesion, the samples that had been heated to 110° C. were analyzed for the area of adhesive covered by the shape memory polymer sheet (CORTUFF) as a percent of adhesive covered. In addition, the total lengths of the original slits as a ratio to the initial area of the shape memory polymer sheet were calculated.

The data are displayed in Table 3. Slitting of the shrink film decreased the area of adhesion after heating causing a corresponding decrease in the level of adhesion.

TABLE 3

Normal Tensile Adhesion After 110° C., Adhesion Area and Ratio of Total Slit Length/Area of Shape-Memory Polymer Sheet

| Sample | Adhesion After 110° C. (N/cm$^2$) | Adhesion Area (%) | Slit Length/Area (cm/cm$^2$) |
|---|---|---|---|
| Ex. 17 | 88 | 56 | 0.7 |
| Ex. 18 | 67 | 40 | 1.6 |
| Ex. 19 | 67 | 38 | 2.4 |
| Ex. 20 | 51 | 31 | 3.2 |
| Ex. 21 | 39 | 16 | 5.5 |
| Ex. 22 | 24 | 11 | 10.2 |
| Comp. Ex. 2 | 73 | 65 | 0 |

Comparative Example 3

A sample of CORTUFF 200 shrink film was treated on each side with a nitrogen corona dose of 5 J/cm$^2$. The sample was then primed on each face with N200J at a concentration of 1.5% solids using a #20 Meyer rod and dried at 80° C. for 1 hour. It was slit into a pattern of squares 3.6 mm on each side, and was laminated to masking tape (3M HIGHLAND 2727) on one face. This film was cut into squares measuring 25 mm×25 mm. A layer of DP100 epoxy (3M) was applied to a 25 mm×25 mm area on one end of a steel test coupon (Type "RS" Steel, 102 mm×25 mm×1.6 mm, Square Corners, Iron Phosphated (B-1000) from Q-Lab Corporation, Cleveland, Ohio). The slit shrink film was applied to the epoxy layer, and the epoxy was allowed to harden for 2 hours. The masking tape was then peeled off of the shrink film, and another layer of DP 100 epoxy was applied to the exposed face of the shrink film. Two pieces of 0.3 mm diameter stainless steel wire were embedded in the uncured epoxy as a bondline spacer. An additional steel coupon was then placed on top of the epoxy and clamped with a pair of binder clips to generate an overlap shear specimen with a 25 mm×25 mm overlap area. Four specimens were prepared, and they were allowed to cure for 44 hours. Two of the specimens were then placed in a 110° C. oven for 30 minutes. The samples were allowed to rest at room temperature for an additional 24 hours, and then tested to failure. The tests were done in overlap shear mode with a Sintech load frame with self-tightening grips and a 20 kN load cell. The test rate was 2.5 mm/min The average peak load for the unheated samples was 2600 N, and they all failed primarily at the epoxy/shrink film interface. The average peak load for the heated samples was 4700 N, and they also failed at the epoxy/shrink film interface. No visible shrinkage of the shrink film had occurred.

Preparatory Example 1

A 12 inch length (305 mm) by 2 inch (51 mm) width segment of CORTUFF heat shrink film (50 microns thick from Sealed Air Corporation, Duncan, S.C.) was attached to POST-IT carrier paper and die cut into 12.7 mm strips using a hand-crank rolling die converter. The sample was then cut with a hand scissors into approximate 51 mm squares and passed back through the hand-crank rolling die converter to produce squares of 0.5 in (12.7 mm) on a side. Die cut squares could then be easily removed with any sufficiently strong adhesive or mechanical means to then be used as a debondable interface Example 23

Figure 6:
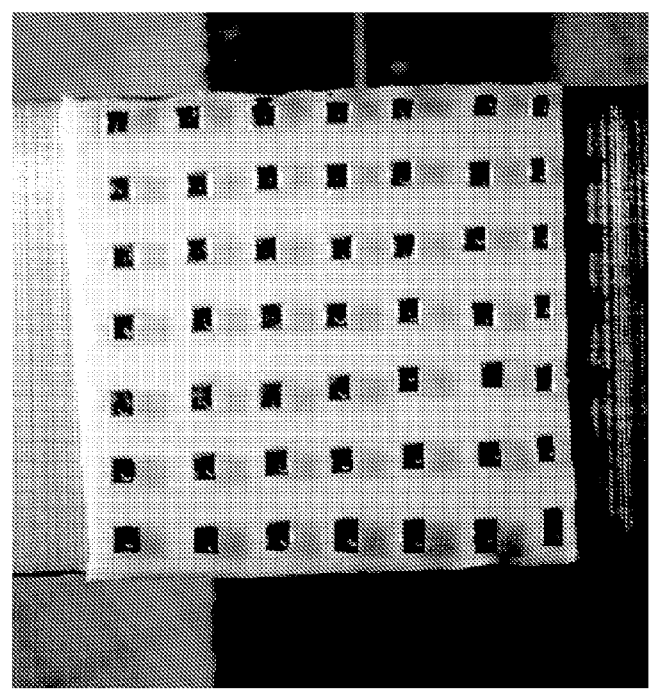
FIG. 6 is a photograph of a portion of a provided adhesive article after debonding.

An article was made according to Example 16 except that in place of one of the VHB 4920 layers a layer of 3M Thermally Conductive Tape 8810 (25 mm wide) was laminated. The resulting multilayer tape was subjected to normal tensile testing. All specimens primarily failed at the interface between one of the Thermally Conductive Tape and the heat shrink film. The average normal tensile adhesion for the unheated sample was 83 N/cm$^2$, and the average peak load for the heated sample was 1.4 N/cm$^2$. The failed specimens from the sample that had been heated were photographed, and the average area covered by the shrunken Cortuff was found to be 10% of the area covered by the VHB. A representative photograph is shown in FIG. 6, in which the shrink film is in its intrinsic shape and is shaded darker with black ink.

Following are exemplary embodiments of a debondable adhesive article and methods of making and using the same according to aspects of the present invention.

Embodiment 1 is a heat-debondable adhesive article comprising: a shape-memory polymer sheet with an area having a strained temporary shape and an intrinsic shape, first and second opposing surfaces, and comprising at least one of a plurality of slits each having a width therein, and wherein the plurality of slits defines a total slit length, wherein if heated to or above a transition temperature range, the shape-memory sheet at least partially converts from its strained temporary shape to its intrinsic shape; a first adhesive having a first thickness and first and second opposing surfaces, wherein the first adhesive comprises a pressure-sensitive adhesive, and wherein a substantial portion of the first opposing surface of the first adhesive layer is disposed upon a substantial portion of the first opposing surface of the shape-memory polymer sheet in its strained temporary shape; and a second adhesive having a second thickness, first and second opposing sides, wherein a substantial portion of the first opposing side of the second adhesive is disposed upon a substantial portion of the second opposing side of the shape-memory polymer in its strained temporary shape.

Embodiment 2 is a heat-debondable adhesive article according to embodiment 1, wherein the shape-memory polymer sheet is biaxially oriented and has a maximum shrink tension in one direction.

Embodiment 3 is a heat-debondable adhesive article according to embodiment 1, wherein the ratio of the total length of the plurality of slits to the area of the shape-memory polymer sheet is greater than about 0.35 cm/cm$^2$.

Embodiment 4 is a heat-debondable adhesive article according to embodiment 1, wherein the width of each of the slits in the plurality of slits is less than the thickness of the first adhesive layer.

Embodiment 5 is a heat-debondable adhesive article according to embodiment 1, wherein the first shape-memory polymer sheet comprises physical crosslinks.

Embodiment 6 is a heat-debondable adhesive article according to embodiment 5, wherein the first shape-memory polymer sheet comprises thermoplastic urethanes or linear, high molecular weight polynorbornene.

Embodiment 7 is a heat-debondable adhesive article according to embodiment 1, wherein the first shape-memory polymer sheet comprises covalent crosslinks.

Embodiment 8 is a heat-debondable adhesive article according to embodiment 7, wherein the first shape-memory polymer sheet comprises epoxies, thermoset urethanes, acrylates, styrenic polymers, crosslinked olefins, or crosslinked ring-opening metathesis polymers.

Embodiment 9 is a heat-debondable adhesive article according to embodiment 1, wherein the first shape-memory polymer sheet is functionalized.

Embodiment 10 is a heat-debondable adhesive article according to embodiment 9, wherein the first shape-memory polymer sheet is functionalized by corona treatment.

Embodiment 11 is a heat-debondable adhesive article according to embodiment 1, wherein the first plurality of slits divides the first shape-memory polymer sheet into two or more pieces.

Embodiment 12 is a heat-debondable adhesive article according to embodiment 11, wherein the first plurality of slits comprises a cross-hatch pattern.

Embodiment 13 is a heat-debondable adhesive article according to embodiment 1, wherein both the first adhesive and the second adhesive comprise a pressure-sensitive adhesive.

Embodiment 14 is a heat-debondable adhesive article according to embodiment 1, wherein the first pressure-sensitive adhesive is selected from an acrylic adhesive, a block copolymer adhesive, a polyurethane adhesive, and a sulfonated polyurethane adhesive.

Embodiment 15 is a heat-debondable adhesive article according to embodiment 2, wherein there is a temperature at which the shrink tension of the shape-memory polymer is sufficiently high to cause a substantial change in the area of the shaped-memory polymer sheet.

Embodiment 16 is a heat-debondable adhesive article according to embodiment 1, wherein upon heating to a transition temperature, the shape-memory polymer sheet converts to its intrinsic shape such that the first adhesive layer is now disposed upon less than about 65% of the surface of the first substrate.

Embodiment 17 is a heat-debondable adhesive article according to embodiment 1, further comprising: a first substrate having a surface in contact with a substantial portion of the second opposing surface of the first adhesive layer.

Embodiment 18 is a heat-debondable adhesive article according to embodiment 17, further comprising: a second substrate in contact with a substantial portion of the second opposing side of the second adhesive.

Embodiment 19 is a heat-debondable adhesive article according to embodiment 1, further comprising an energy absorbing layer.

Embodiment 20 is a method of preparing a debondable adhesive article comprising: providing a shape-memory polymer sheet having a strained temporary shape and an intrinsic shape, first and second opposing sides, comprising a plurality of slits each having a width therein, wherein if heated to or above a transition temperature, the shape-memory sheet at least partially converts from the strained temporary shape to its intrinsic shape, and wherein a first adhesive having first and second opposing sides is disposed upon a substantial portion of the first opposing side of the shape-memory polymer; and applying the second opposing side of the first adhesive to a first substrate.

Embodiment 21 is a method of preparing a debondable adhesive article according to embodiment 20 further comprising: applying a first opposing side of a second adhesive to a second substrate; and disposing the second adhesive upon a substantial portion of the a second opposing side of the shape-memory polymer sheet.

Embodiment 22 is a method of preparing a debondable adhesive article according to embodiment 21, wherein at least one opposing side of the shape-memory polymer sheet has been functionalized.

Embodiment 23 is a method of debonding an adhesive article comprising: providing an article that includes a first substrate having a first and a second opposing side comprising: a shape-memory polymer sheet with an area having a strained temporary shape, and an intrinsic shape, a transition temperature, first and second opposing surfaces, and comprising a plurality of slits therein; a first adhesive layer having a first thickness and first and second opposing surfaces wherein the first opposing surface of the first adhesive layer is disposed upon a substantial portion of the first opposing surface of the shape-memory polymer sheet in its strained temporary shape; and a first substrate having a surface in contact with a substantial portion of the second opposing surface of the first adhesive layer; heating the article to a first temperature above the first transition temperature so as to convert the first shape-memory polymer sheet from its strained temporary shape to its intrinsic shape; and debonding the first substrate.

Embodiment 24 is a method of debonding an adhesive article according to embodiment 23, wherein the article further comprises: a second substrate in contact with a substantial portion of the second opposing side of the second adhesive.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A heat-debondable adhesive article comprising:
   a shape-memory polymer sheet comprising polyethylene with an area having a strained temporary shape and an intrinsic shape, first and second opposing surfaces, and comprising a plurality of slits each having a width therein, and wherein the plurality of slits defines a total slit length, wherein the first opposing surface of the shape-memory polymer sheet is functionalized by corona treatment or treatment with a chemical primer, wherein if heated to a temperature below 80° C., the shape-memory polymer sheet does not undergo a substantial change in length, and wherein if heated to or above a transition temperature range, the shape-memory polymer sheet at least partially converts from its strained temporary shape to its intrinsic shape;
   a first adhesive layer having a first thickness and first and second opposing surfaces, wherein the first adhesive layer comprises a foamed adhesive, and
   wherein a substantial portion of the first opposing surface of the first adhesive layer is disposed upon a substantial portion of the first opposing surface of the shape-memory polymer sheet in its strained temporary shape; and
   a second adhesive layer having a second thickness, first and second opposing sides, wherein a substantial portion of the first opposing side of the second adhesive layer is disposed upon a substantial portion of the second opposing side of the shape-memory polymer sheet in its strained temporary shape, wherein the shape-memory polymer sheet in its intrinsic shape debonds from the first adhesive layer.

2. A heat-debondable adhesive article according to claim 1, wherein the shape-memory polymer sheet is biaxially oriented and has a maximum shrink tension in one direction.

3. A heat-debondable adhesive article according to claim 1, wherein the ratio of the total length of the plurality of slits to the area of the shape-memory polymer sheet is greater than about 0.35 cm/cm$^2$.

4. A heat-debondable adhesive article according to claim 1, wherein the width of each of the slits in the plurality of slits is less than the thickness of the first adhesive layer.

5. A heat-debondable adhesive article according to claim 1, wherein the shape-memory polymer sheet comprises physical crosslinks.

6. A heat-debondable adhesive article according to claim 5, wherein the shape-memory polymer sheet comprises thermoplastic urethanes or linear, high molecular weight polynorbornene.

7. A heat-debondable adhesive article according to claim 1, wherein the shape-memory polymer sheet comprises covalent crosslinks.

8. A heat-debondable adhesive article according to claim 7, wherein the shape-memory polymer sheet comprises epoxies, thermoset urethanes, acrylates, styrenic polymers, crosslinked olefins, or crosslinked ring-opening metathesis polymers.

9. A heat-debondable adhesive article according to claim 1, wherein the plurality of slits divides the shape-memory polymer sheet into two or more pieces.

10. A heat-debondable adhesive article according to claim 9, wherein the plurality of slits comprises a cross-hatch pattern.

11. A heat-debondable adhesive article according to claim 1, wherein at least one of the first adhesive layer and the second adhesive layer comprise a pressure-sensitive adhesive.

12. A heat-debondable adhesive article according to claim 11, wherein the pressure-sensitive adhesive is selected from an acrylic adhesive, a block copolymer adhesive, a polyurethane adhesive, and a sulfonated polyurethane adhesive.

13. A heat-debondable adhesive article according to claim 2, wherein there is a temperature at which the shrink tension of the shape-memory polymer is sufficiently high to cause a substantial change in the area of the shaped-memory polymer sheet.

14. A heat-debondable adhesive article according to claim 1, wherein upon heating to a transition temperature, the shape-memory polymer sheet converts to its intrinsic shape such that the first adhesive layer is now disposed upon less than about 65% of the surface of the first substrate.

15. A heat-debondable adhesive article according to claim 1, further comprising:

a first substrate having a surface in contact with a substantial portion of e second opposing surface of the first adhesive layer.

16. A heat-debondable adhesive article according to claim 15, further comprising:

a second substrate in contact with a substantial portion of the second opposing side of the second adhesive.

17. A heat-debondable adhesive article according to claim 1, further comprising an energy absorbing layer.

18. The heat-debondable adhesive article of claim 1 wherein the first adhesive layer or the second adhesive layer comprises a plurality of slits each having a width therein, and wherein the plurality of slits in the first adhesive layer or the second adhesive layer together with the plurality of slits in the shape-memory polymer sheet define a total slit length.

19. The heat-debondable adhesive article of claim 1 wherein the shape-memory polymer sheet in the intrinsic shape does not debond from the second adhesive layer.

20. The heat-debondable adhesive article of claim 1 wherein the shape-memory polymer sheet in the intrinsic shape cleanly debonds from the first adhesive layer.

21. The heat-debondable adhesive article of claim 1 wherein the first adhesive layer comprises an acrylic foam tape.

* * * * *

UNITED STATES PATENT AND TRADEMARK OFFICE
CERTIFICATE OF CORRECTION

PATENT NO. : 9,821,529 B2  
APPLICATION NO. : 14/233398  
DATED : November 21, 2017  
INVENTOR(S) : Joseph Rule Page 1 of 1

It is certified that error appears in the above-identified patent and that said Letters Patent is hereby corrected as shown below:

Column 2  
Line 49, delete "the a" and insert -- the --, therefor.  
Line 50, after "sheet" insert -- . --.

Column 3  
Line 39-41, delete ""transition temperature range" refers to the shape-memory transition temperature range." and insert the same on Column 3, Line 40 as a new paragraph.

Column 18  
Line 24 (approx.), delete "Example2" and insert -- Example 2 --, therefor.

Column 19  
Line 51 (approx.), delete "mm/min" and insert -- mm/min. --, therefor.

Column 20  
Line 3, after "interface" insert -- . --.

Column 22  
Line 1, delete "the a" and insert -- the --, therefor.

Column 24  
Line 17 (approx.), in Claim 15, delete "e" and insert -- the --, therefor.

Signed and Sealed this  
Twenty-eighth Day of August, 2018

Andrei Iancu  
*Director of the United States Patent and Trademark Office*